(12) United States Patent
Okada et al.

(10) Patent No.: US 8,124,262 B2
(45) Date of Patent: Feb. 28, 2012

(54) BATTERY PACK AND BATTERY PACK SEPERATOR

(75) Inventors: Wataru Okada, Hyogo (JP); Shinsuke Nakamura, Hyogo (JP)

(73) Assignee: Sanyo Electric Co., Ltd., Osaka (JP)

( * ) Notice: Subject to any disclaimer, the term of this patent is extended or adjusted under 35 U.S.C. 154(b) by 701 days.

(21) Appl. No.: 12/289,249

(22) Filed: Oct. 23, 2008

(65) Prior Publication Data

US 2009/0111010 A1    Apr. 30, 2009

(30) Foreign Application Priority Data

Oct. 31, 2007  (JP) ................................ 2007-282859

(51) Int. Cl.
*H01M 2/12* (2006.01)
*H01M 6/42* (2006.01)
*H01M 2/38* (2006.01)

(52) U.S. Cl. .............. 429/71; 429/72; 429/83; 429/120; 429/149; 429/152

(58) Field of Classification Search ......................... None
See application file for complete search history.

(56) References Cited

U.S. PATENT DOCUMENTS

2006/0115720 A1 * 6/2006 Kim .............................. 429/156
2007/0026303 A1   2/2007 Jeon et al.

FOREIGN PATENT DOCUMENTS

| EP | 1 139 483 | 10/2001 |
| EP | 1 662 602 | 5/2006 |
| JP | 2004-362879 | 12/2004 |

OTHER PUBLICATIONS

European Search Report (in English language) issued Jan. 21, 2009 in European Patent Application No. 08 01 8669.

* cited by examiner

*Primary Examiner* — Cynthia Lee

(74) *Attorney, Agent, or Firm* — Wenderoth, Lind & Ponack, L.L.P.

(57) ABSTRACT

A battery pack includes plural battery cells (1), and insulating separators (10) disposed between adjacent battery cells (1), where the plurality of battery cells are disposed in a stacked configuration with a prescribed gap between the adjacent battery cells. A separator (10) has plural gas channels that enable the flow of cooling gas. The gas channels have cooling gas entranceways and exit ways, which open at the sides of the battery block formed by the stacked battery cells. The separator 10 has cut sections formed to position the entranceways and exit ways of the gas channels inward from the sides of the battery block.

This allows cooling gas near entranceways and exit ways to be smoothly introduced to, and exhausted from the gas channels, and reduces cooling gas pressure losses in those regions.

15 Claims, 10 Drawing Sheets

BACKGROUND ART

BATTERY PACK AND BATTERY PACK SEPERATOR

BACKGROUND OF THE INVENTION

1. Technical Field of the Invention

The present invention relates to a battery pack and battery pack separator used in applications such as a car power source apparatus.

2. Description of the Related Art

In a car power source apparatus, many individual batteries (battery cells) are connected in series to increase output voltage and output power. Since this power source apparatus is charged and discharged with high currents, battery temperatures rise. Further, because the power source apparatus must be usable even in extreme high temperature environments, forced cooling of the batteries is essential. Power source apparatus on-board present day hybrid cars are cooled by forced ventilation of the batteries with cooling air delivered by fan.

Since batteries in these power source apparatus are cooled by air, rapid cooling is difficult when abnormal battery temperature rise occurs. Further, because ventilation and cooling is via air, which has low heat capacity, it is difficult to cool many batteries to a uniform temperature.

As a battery pack to correct these drawbacks, Japanese Patent Application Disclosure 2004-362879 describes a cooling configuration as shown in FIG. 1. Here, cooling air channels 72 are established by separators 70 disposed between adjacent battery cells 71, and cooling air is delivered through those cooling air channels 72. A battery pack having this type of structure is shown in the plan view of FIG. 2. Here, cooling air is delivered into an air duct 74 provided along the battery cell 71 stacking direction of one side (bottom side in FIG. 2) of the battery pack. This cooling air is divided, passed through the cooling air channels 72 formed between adjacent battery cells 71, collected at the opposite side (top side in FIG. 2) of the battery pack, and discharged to the outside.

SUMMARY OF THE INVENTION

However, uniform cooling of all battery cells 71 without developing temperature unevenness is difficult with this structure. This is because pressure losses result when cooling air is introduced to the input-side and exhausted from the output-side of the cooling air channels 72, and differences in cooling capability develop due to pressure differences between the input-side and the output-side. Since cooling capability at the output-side is less than cooling capability at the input-side, local differences in cooling capability develop between the two sides and uniform cooling cannot be achieved. In particular, in the case of forced cooling where cooling air is introduced to the input-side by a ventilating device such as a fan, cooling air has a tendency to accumulate if the input is narrow.

Further, because of present day demand for a smaller size battery pack, large gaps cannot be allocated between battery cells. Meanwhile in contrast to the extremely narrow slit shaped cooling air channels, the widths of air duct openings are made large to supply cooling air for the many cooling air channels. Consequently, the difference in cross-sectional area between the air ducts and the cooling air channels is large, and pressure losses increase as a result. In addition, as shown in FIG. 2, the air ducts extend in the battery cell stacking direction while cooling air channels extend in a direction perpendicular to that. Therefore, the path of airflow makes a right angle and turbulent flow is easily generated near cooling air channel entranceways. Similarly, turbulent flow is easily generated at the exit-side of the cooling air channels. Consequently, pressure losses further increase.

The present invention was developed to resolve these types of problems. Thus, it is one object of the present invention to provide a battery pack and battery pack separator that reduces generation of pressure losses to achieve more uniform battery cooling.

To address the problems described above, the first battery pack of the present invention is provided with a plurality of battery cells, and insulating separators disposed between adjacent battery cells, where the plurality of battery cells are disposed in a stacked configuration with a prescribed gap between adjacent battery cells. A separator is provided with a plurality of gas channels that enable the flow of cooling gas. The gas channels have cooling gas entranceways and exit ways, which open at the sides of the battery block formed by the stacked battery cells. Furthermore, a separator has cut sections formed to position the entranceways and exit ways of the gas channels inward from the sides of the battery block. This allows cooling gas near entranceways and exit ways to be smoothly introduced to, and exhausted from the gas channels, and reduces cooling gas pressure losses in those regions. The pressure difference between the input-side and output-side is also reduced, and cooling capability can approach uniformity.

The second battery pack of the present invention is provided with a plurality of battery cells, and insulating separators disposed between adjacent battery cells, where the plurality of battery cells are disposed in a stacked configuration with a prescribed gap between adjacent battery cells. A separator is provided with a plurality of gas channels that enable the flow of cooling gas. The gas channels have cooling gas entranceways and exit ways, which open at the sides of the battery block formed by the stacked battery cells. Furthermore, a separator has a cut section formed to position at least the entranceways of the gas channels inward from the sides of the battery block. This allows cooling gas near entranceways, believed related to particularly large pressure losses, to be smoothly introduced to, and exhausted from the gas channels, and this reduces cooling gas pressure losses in those regions. The pressure difference between the input-side and output-side is also reduced, and cooling capability can approach uniformity.

In the third battery pack, a separator can be formed with its battery block side-facing edges positioned, except for battery cell corner regions, interior to the sides of the battery block by an approximately constant standoff distance. This allows cooling gas introduction to each gas channel under approximately the same conditions, and allows capability for more uniform cooling.

In the fourth battery pack, a separator can be formed with its battery block side-facing edges displaced a distance inward from the sides of the battery block, and that distance increases from battery block corner regions towards the center. This allows cooling gas introduction to gas channels over a wide area near the center region while maintaining electrical insulation by covering battery cell corner regions with separator corners. This configuration has the merit that pressure losses near center regions are reduced and cooling capability can be enhanced.

In the fifth battery pack, a separator can be formed, except at battery cell corner regions, with its battery block side-facing edges displaced a distance inward from the sides of the battery block, and that distance decreases from battery block corner regions towards the center. This can maintain electrical insulation by covering battery cell corner regions with separator corners, and can cover wide areas of battery cell surface at center regions. This configuration can sustain electrical isolation even when a battery cell external case expands due to conditions such as an increase in internal battery pressure.

In the sixth battery pack, a separator can be formed with its battery block side-facing edges made thinner except at battery cell corner regions. This can maintain separator strength with thick corner regions while reducing pressure losses by thinning other regions near the sides of the battery block. In addition, since electrical isolation can be maintained by local separator thinning instead of establishing cut sections, short-circuiting between battery cells can be prevented and safety improved.

In the seventh battery pack, a plurality of parallel gas channels can be established in straight lines from one side of the battery block to the other side.

In the eighth battery pack, gas channels with rectangular cross-sections can be formed by providing a plurality of troughs and protrusions in separator surfaces. Separator troughs are closed off by battery cell surfaces to form gas channels with rectangular cross-sections.

In the ninth battery pack, the external shape of the battery cells can be approximately rectangular. This takes advantage of the merit of a rectangular battery pack well suited for size reduction. Specifically, cooling capability can be improved without changing the width of gas channels between battery cells.

In the tenth battery pack, the external shape of the battery cells can be circular cylindrical. This allows circular cylindrical batteries as well as rectangular batteries to be used beneficially in the present invention.

Finally, the eleventh battery pack separator is an insulating separator inserted between adjacent battery cells, where a plurality of battery cells makes up the battery pack. A separator is provided with a plurality of gas channels that enable the flow of cooling gas. The gas channels have cooling gas entranceways and exit ways, which open at the sides of the battery block formed by the stacked battery cells. Furthermore, a separator has cut sections formed to position the entranceways and exit ways of the gas channels inward from the sides of the battery block. This allows cooling gas near entranceways and exit ways to be smoothly introduced to, and exhausted from the gas channels, and reduces cooling gas pressure losses in those regions. The pressure difference between the input-side and output-side is also reduced, and cooling capability can approach uniformity. The above and further objects of the present invention as well as the features thereof will become more apparent from the following detailed description to be made in conjunction with the accompanying drawings.

DETAILED DESCRIPTION OF THE PREFERRED EMBODIMENTS

First embodiment

Figure 3:
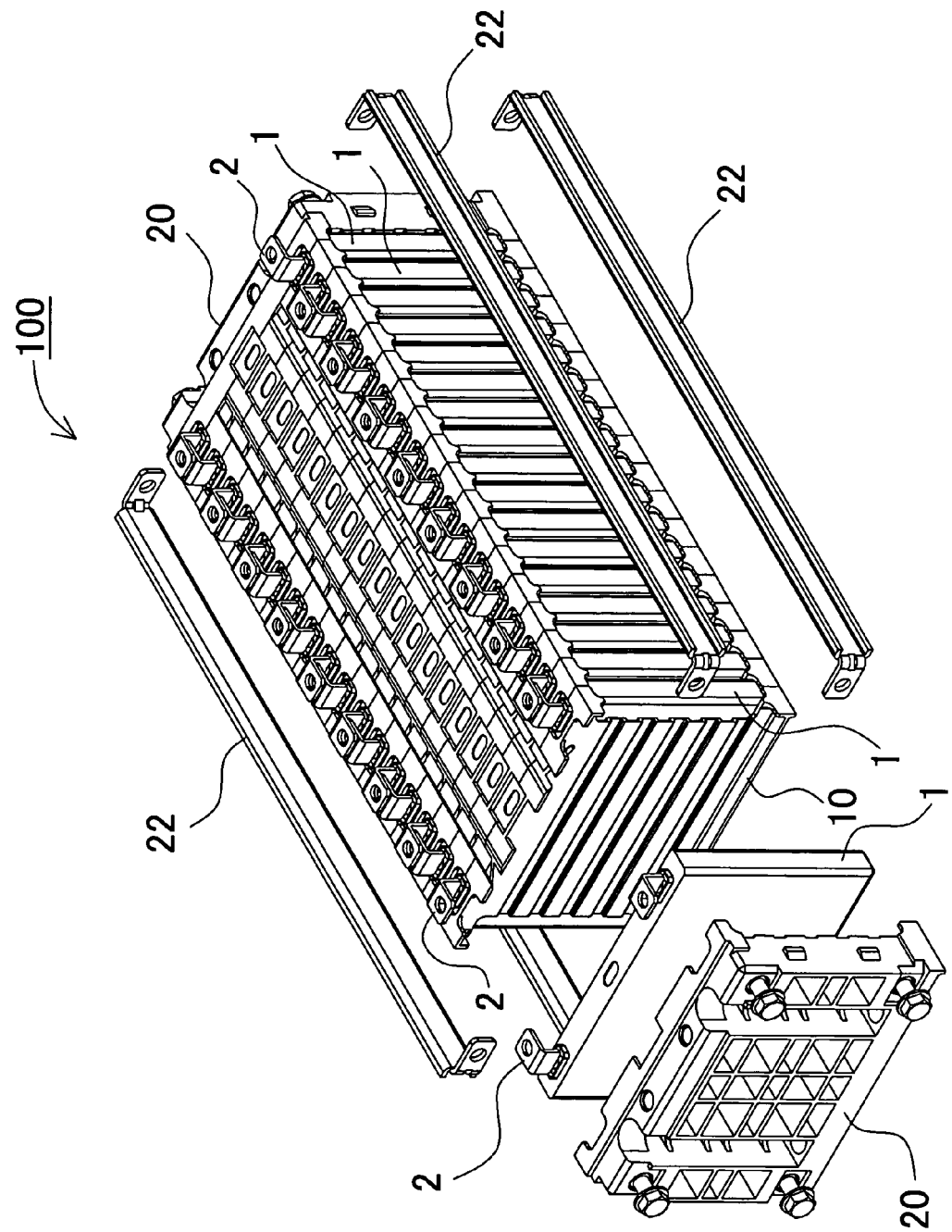
FIG. 3 is an exploded perspective view showing a battery pack for the first form of embodiment of the present invention.
Figure 4:
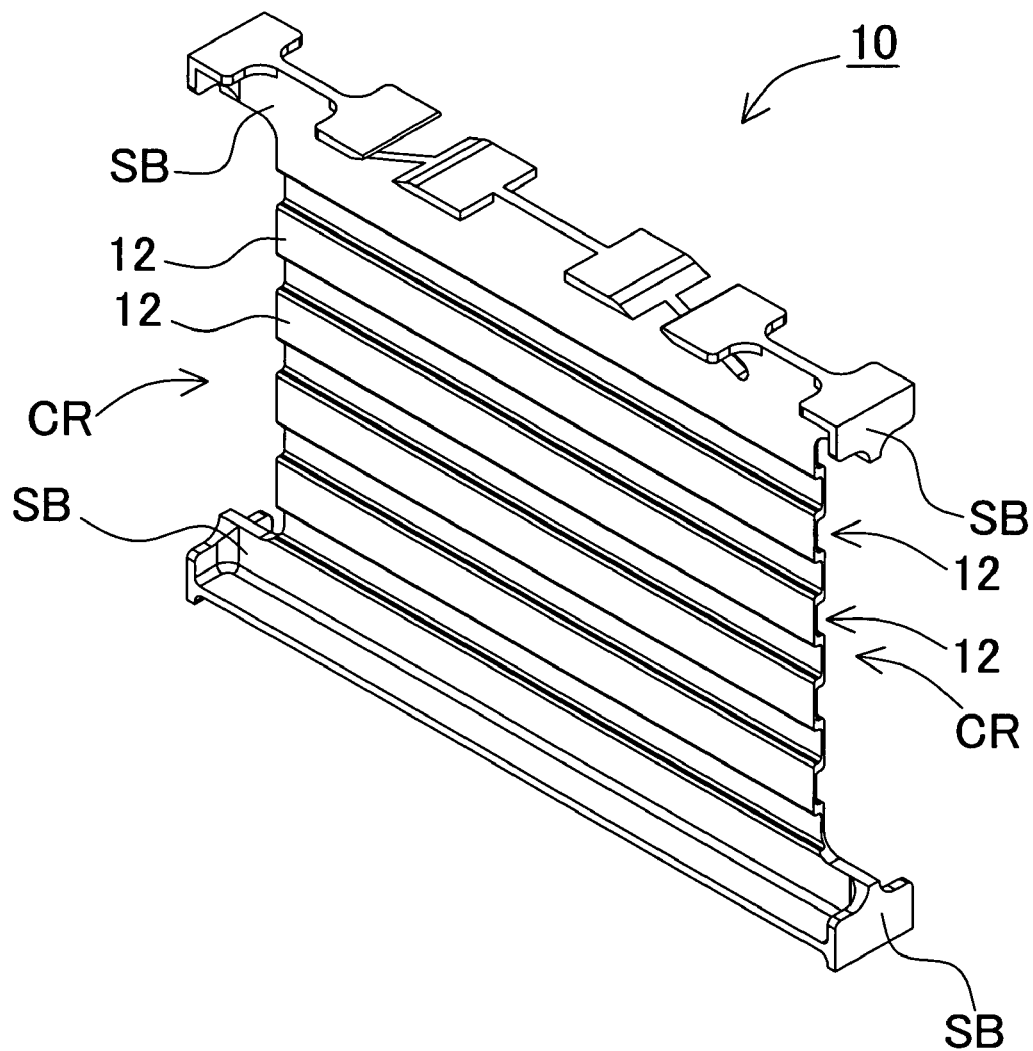
FIG. 4 is a perspective view showing the separator of FIG. 3.
Figure 5:
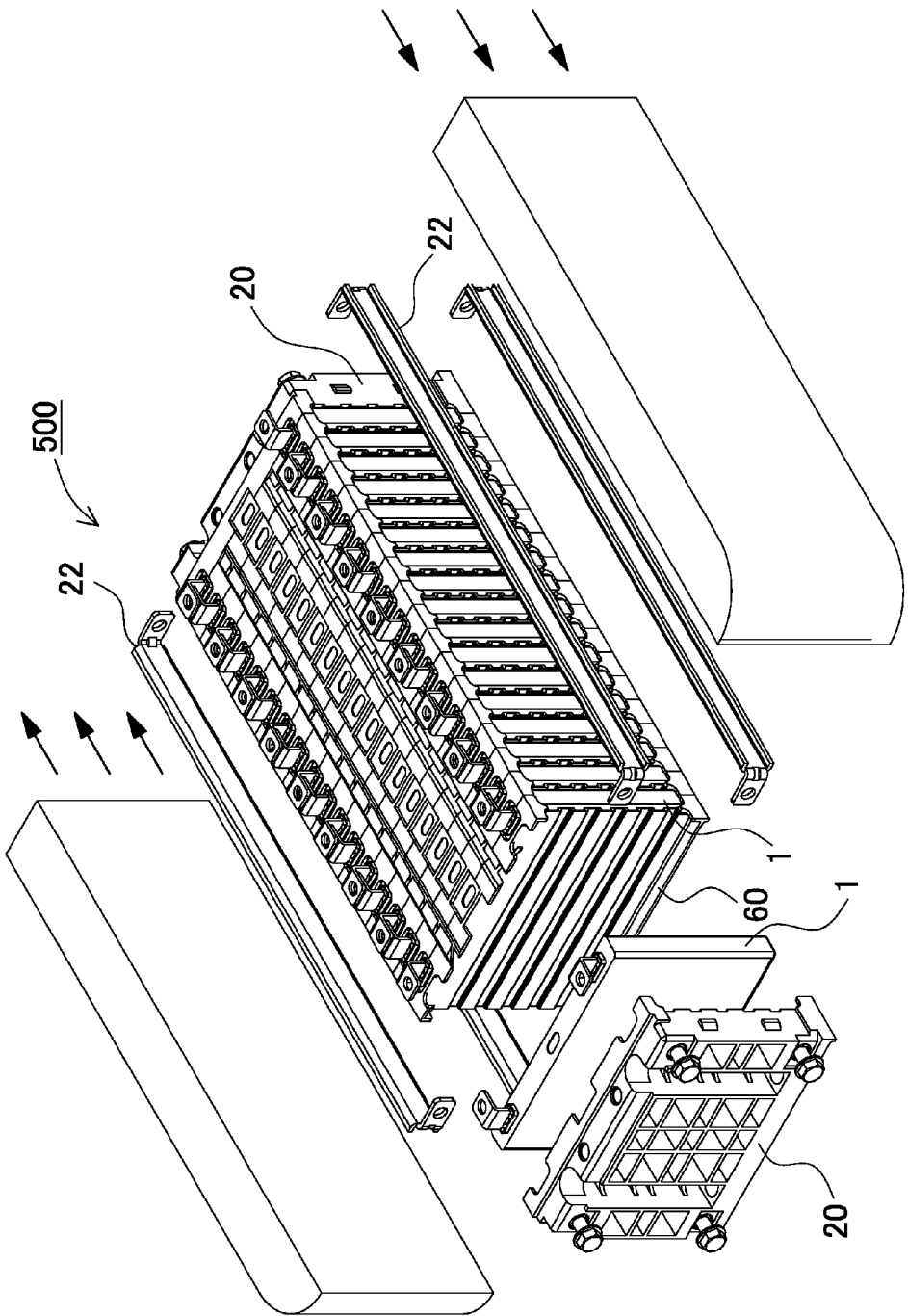
FIG. 5 is an exploded perspective view showing a battery pack that uses a prior art separator.
Figure 6:
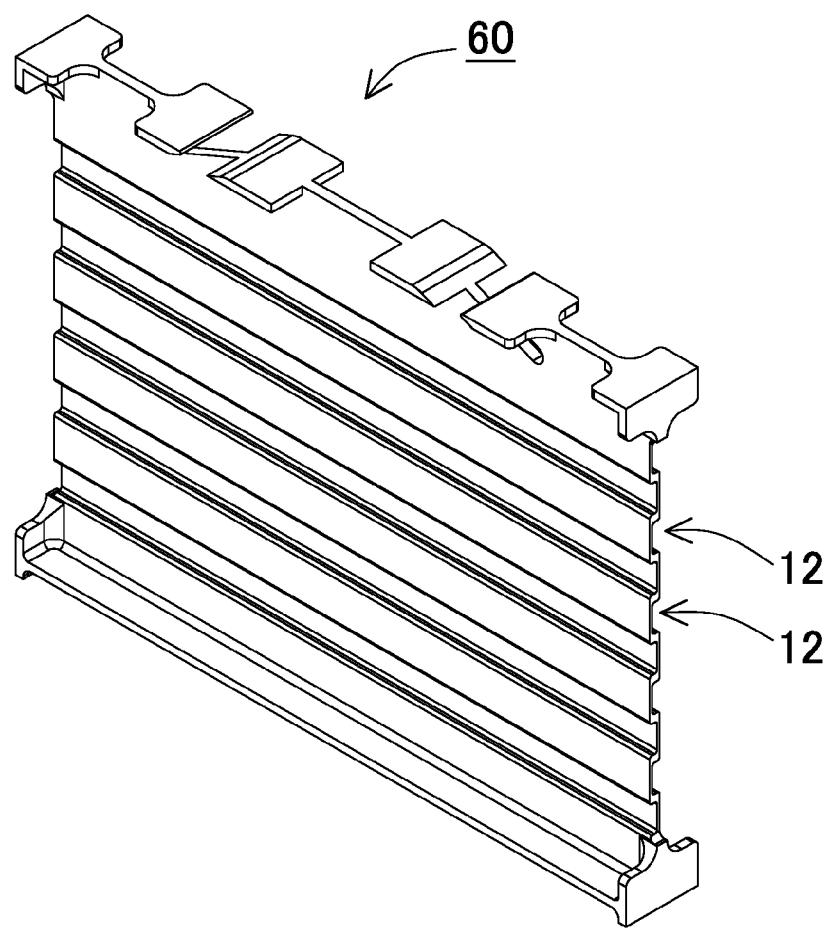
FIG. 6 is a perspective view showing the separator of FIG. 5.

FIGS. 3 and 4 show an exploded perspective view of a battery pack 100 for the first form of embodiment of the present invention and a perspective view of a separator, respectively. For comparison, FIGS. 5 and 6 show an exploded perspective view of a battery pack 500 that uses a prior art separator and a perspective view of that separator, respectively. These battery packs are made up of battery blocks having a plurality of battery cells 1 stacked in the same orientation. Separators 10, 60 are sandwiched between adjacent battery cells 1. Endplates 20 are disposed at both ends of a battery block, and these endplates 20 are held in position, with the battery block in between, by lengthwise retaining rails 22.

Battery block

The battery block shown in FIG. 3 is a battery block for use on-board a car. The battery block is configured with a plurality of battery cells 1 and separators 10 stacked alternately and covered at the left and right ends by endplates 20. Specifically, rectangular battery cells 1 are sandwiched by frame-shaped separators 10 and stacked in multiple tiers while exposing the top and side surfaces of the battery cells 1. In this example, 18 battery cells 1 are stacked on their primary (largest area) surfaces.

Battery cells

Rectangular batteries enclosed by an external case with an approximately rectangular shape are used as battery cells 1. A rectangular battery cell is formed in the shape of a thin box that is thinner than it is wide, and preferably has truncated edge regions. Compared with circular cylindrical batteries, rectangular battery cells can be arranged more efficiently to increase energy density in a given volume. This is particularly desirable for applications on-board cars where space reduction is an important requirement. However, depending on the application and space available, it should be understood that circular cylindrical batteries can also be used. Rectangular rechargeable batteries such as lithium ion rechargeable batteries can be used as battery cells. In addition, other battery types such as nickel batteries, and even primary (non-rechargeable) batteries can be used. Output terminals 2 of each battery cell 1 are wired together in series or parallel. Further, a control circuit (not illustrated) is connected in the battery pack end region. Parameters such as battery cell voltage, current, and temperature are measured by the control circuit, and battery capacity, required charge and discharge capacity, etc. are determined to control operations such as charging and discharging.

A battery cell 1 has positive and negative output terminals 2 projecting from the upper surface of a rectangular external case, which has truncated edges on its sides. Output terminals 2 are positioned to project from the upper surface with left-right symmetry with respect to the primary (largest area) surfaces of the external case. As a result, when battery cells 1 are laterally flipped-over and stacked, positive electrodes and negative electrodes can line-up to allow easy connection in series. Each output terminal 2 is bent in an L-shape. Here, positive and negative output terminals 2 are bent in opposite directions as shown, for example, in FIG. 3. Not only do the ends of the bent regions of output terminals 2 of adjacent battery cells 1 point in opposite directions, but they are also designed to establish a given standoff distance when battery cells 1 are in the stacked configuration. Output terminals 2 are bent in L-shapes, connecting holes are opened through bent regions, and bolts are inserted through connecting holes to connect overlapping bent regions. In this manner, the positive electrode and negative electrode are connected in series between adjacent batteries to connect a plurality of batteries in series. However, adjacent battery cells can also be connected in series via metal-plate bus bar connection to the output terminals 2. In a power source apparatus with battery cells 1 connected in series as described above, output voltage can be increased to enable large output. However, the power source apparatus can also have battery cells 1 connected in parallel and series.

A rectangular case makes up the external case of a battery cell 1. Rolled electrodes are inserted into the open end of the closed-bottom rectangular cylindrical external case, liquid electrolyte is introduced, the open end is closed off with a sealing cap, and the external case is sealed closed by a technique such as laser welding. This rectangular case is made of metal having superior heat conduction properties. A safety valve is provided in the sealing cap, and if the battery is charged or discharged under abnormal conditions, the safety valve can open to discharge electrolyte. In addition, this battery cell 1 has vertically protruding terminal ribs established around the perimeters of output terminals 2. These terminal ribs can prevent unnecessary spreading of electrolyte liquid even if it leaks from inside the external case out around the perimeter of an output terminal 2.

Separator

As shown in FIGS. 3 and 5, battery cells 1 are sandwiched on both primary surfaces by separators 10 that cover those external surfaces. A separator 10 has a frame-shaped structure with a size that covers the four corners of a battery cell 1. When a battery cell 1 is covered by a separator 10, both side surfaces and the top and bottom surfaces are exposed while the four corner regions are covered.

Further, corner regions SB of adjacently stacked separators 10 abut. Separators 10 are made from material with superior thermal insulating and high temperature properties, and are preferably formed from lightweight, inexpensive resin. For example, synthetic resins with low thermal conductivity (0.5 W/m or less is desirable) such as polypropylene or polyurethane can be used. As a result, battery cells 1 are protected by separators 10, and adjacent battery cells 1 are both electrically and thermally insulated from one another.

Figure 1:
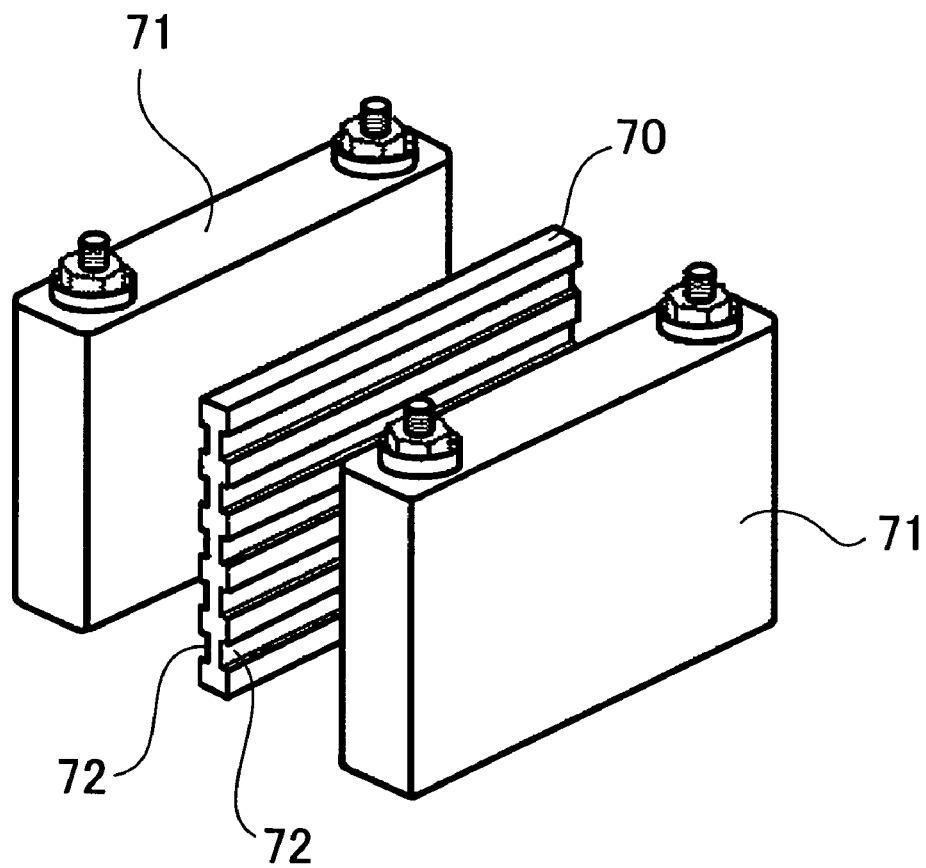
FIG. 1 is an external perspective view showing a battery pack cooled by the region between battery cells.
Figure 2:
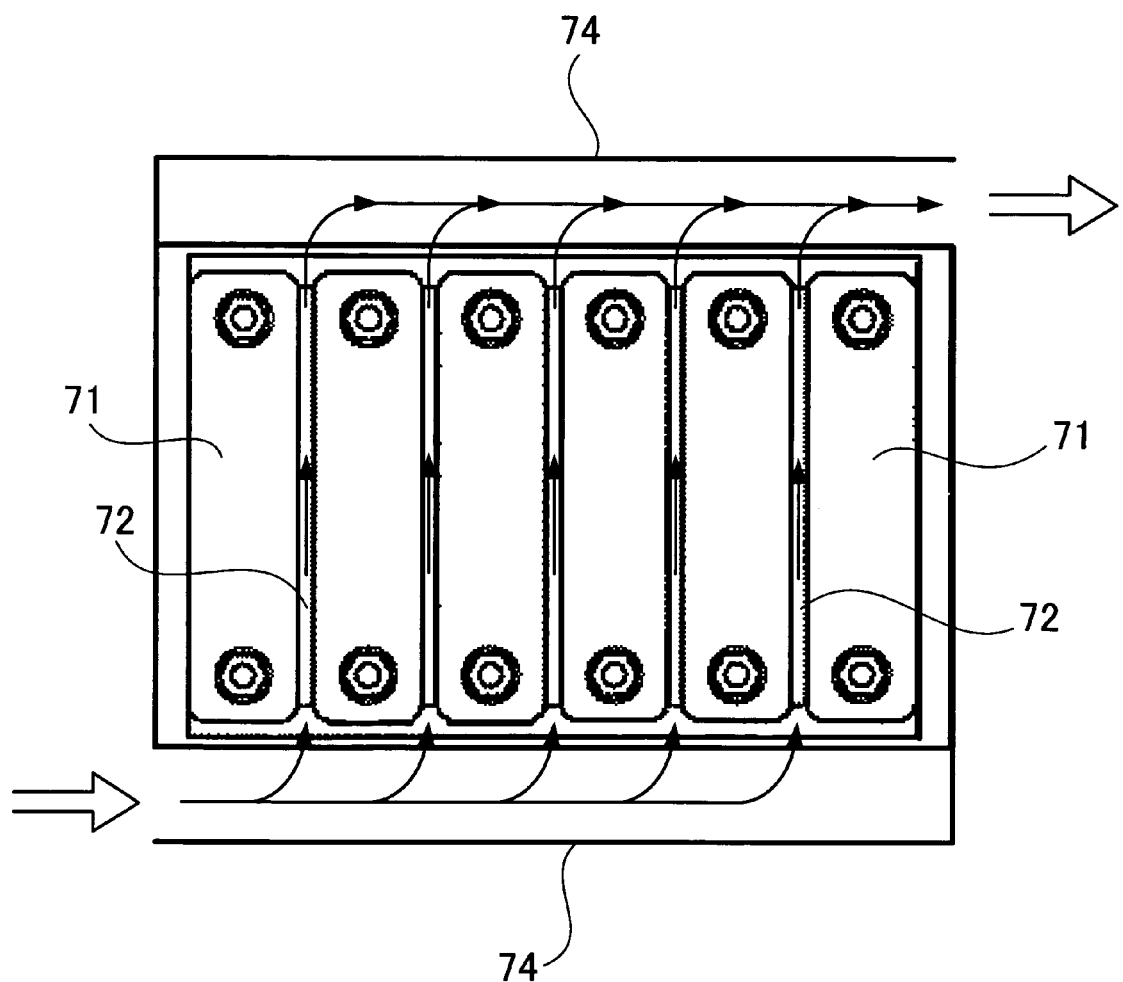
FIG. 2 is a plan view showing the path of cooling air delivered to gaps in the battery pack.

The surface of a separator 10 has a cross-section with troughs and protrusions that form slits 12. By forming the separator surface with a cross-section of continuous troughs and protrusions, open troughs can be closed off by contact with a battery cell surface, and gas channels that laterally traverse the battery cell 1 can be easily formed. A plurality of parallel gas channels are established in straight lines at approximately fixed intervals in the vertical direction of a battery cell 1. These slits 12, which are the gas channels, cool battery cells 1 by passing a cooling medium such as cooling air. Although the cooling medium is preferably air, other cooling gases can also be used as appropriate. In addition, as shown in FIG. 5, air ducts 24 are disposed on both sides of the battery block. A device for ventilating cooling air such as a fan (not illustrated) is connected with the air ducts 24 to supply the air ducts 24 with cooling air. Air ducts 24 connect with each slit 12, which opens at the sides of the battery block and traverses across the battery block. As shown in FIG. 2, this arrangement allows cooling air flowing through the air ducts 24 to be forced through each slit 12.

Endplates End-planes of a battery block, which has separators 10 and battery cells 1 alternately stacked and joined as described above, are covered and held in place by endplates 20. An endplate 20 is made with a size that allows it to cover an exposed battery cell 1 at an end of a battery block. Endplates 20 hold the battery block by sandwiching it from both ends. In the example of FIG. 3, a pair of screw holes is provided at the sides of each endplate 20, and lengthwise retaining rails 22 extend along the sides of the battery pack of stacked battery cells 1 and screw-attach to both endplates 20 to hold the unit. Metal or resin, which can preferably be molded as a single piece, can also be used to make endplates 20.

Cut sections CR

The prior art separator 60 shown in FIGS. 5 and 6 has a size and shape that can essentially cover an entire primary (largest area) surface of a battery cell 1. In comparison, the separator 10 for the first form of embodiment shown in FIGS. 3 and 4 is shaped with concavity on both sides, and as a result, is smaller than the primary surface of a battery cell 1. Specifically, as shown in FIG. 3, recessed cut sections CR are formed on both sides of the separators 10 so as to partially expose the battery cells 1 near the sides of the battery block. While cut sections CR are formed inward on the primary surface of a battery cell 1, corner regions SB, which are part of the separator 10 frame, are retained. In this manner, separator strength can be maintained, while gas channel entranceways and exit ways are opened wider. This can suppress generation of turbulent flow and reduce pressure losses. Losses are particularly high when forced cooling air delivered by the air ducts is guided into narrow slits. In addition, losses are high when cooling air is redirected from its flow along the stacking direction of the battery cells 1 to a direction perpendicular to that flow. By establishing cut sections CR at the entranceway-sides of separators 10, open space is allocated at gas channel entranceways. Once cooling air flows into that open space, it is guided into gas channel slits 12. Therefore, pressure loss generation is buffered by the open space, and cooling airflow becomes smoother. Similarly, pressure losses at the exit way-sides can also be reduced by a larger open space. Here, symmetric cut sections CR at the entranceway-side and exit way-side of a separator are preferable. In that case, either the right or left side of a separator can be used as the entranceway-side (or exit way-side). This type of separator 10 can be made as a single-piece by techniques such as resin molding, or a preformed rectangular separator can be mechanically modified to remove sections of the separator.

By giving the separator 10 a shape with fixed-width cutouts only at side edges, a wide region of the primary surface of the battery cell 1 can be covered, and insulation between battery cells 1 is maintained. In particular, the part of the battery cell 1 exposed by the cut section CR is the edge region of the external case, which is a structurally strong region. Therefore, even if battery cells 1 expand to some degree, contact between adjacent battery cells 1 can be avoided because there is little battery case deformation in the exposed regions.

Second embodiment

Figure 7:
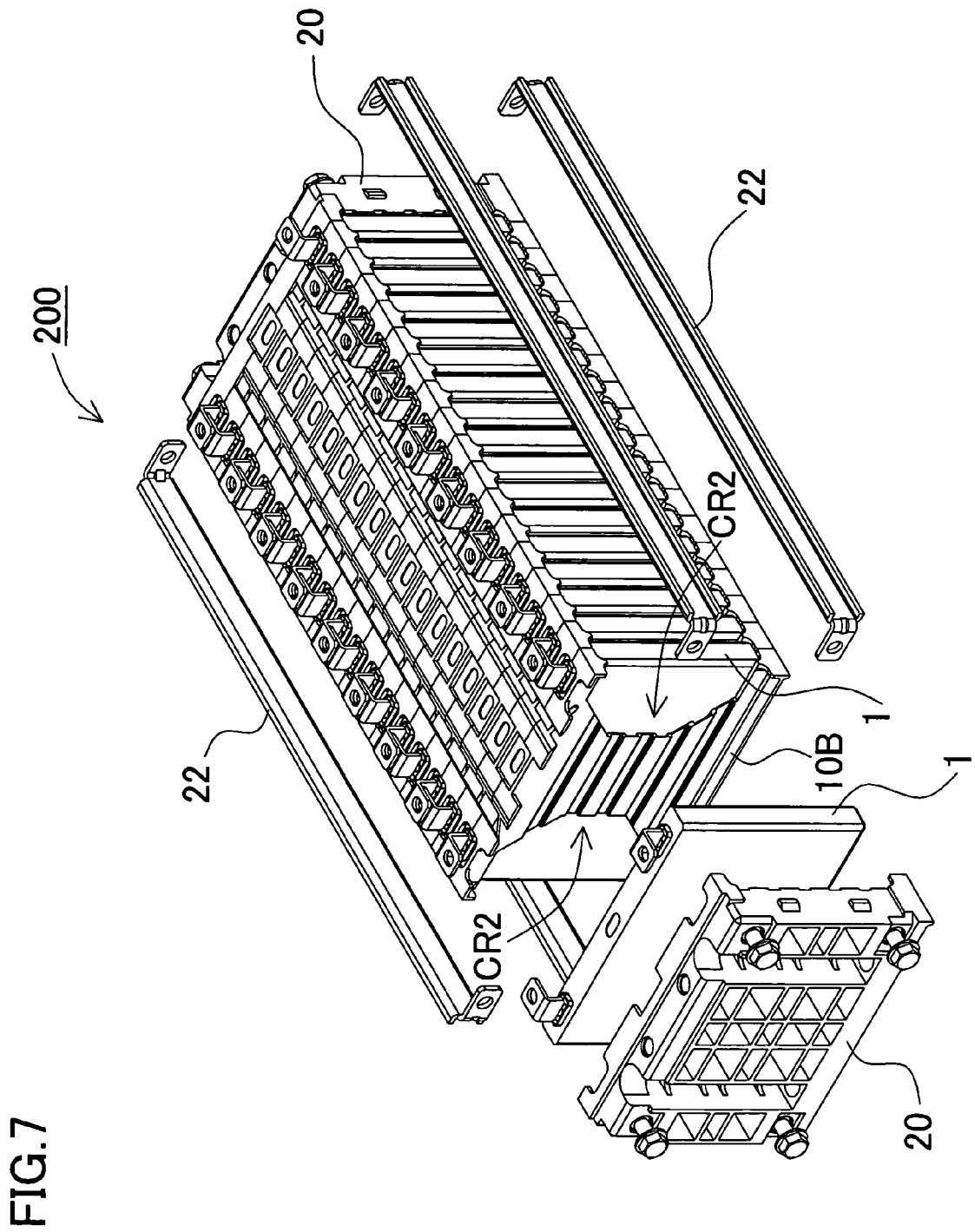
FIG. 7 is an exploded perspective view showing a battery pack for the second form of embodiment of the present invention.
Figure 8:
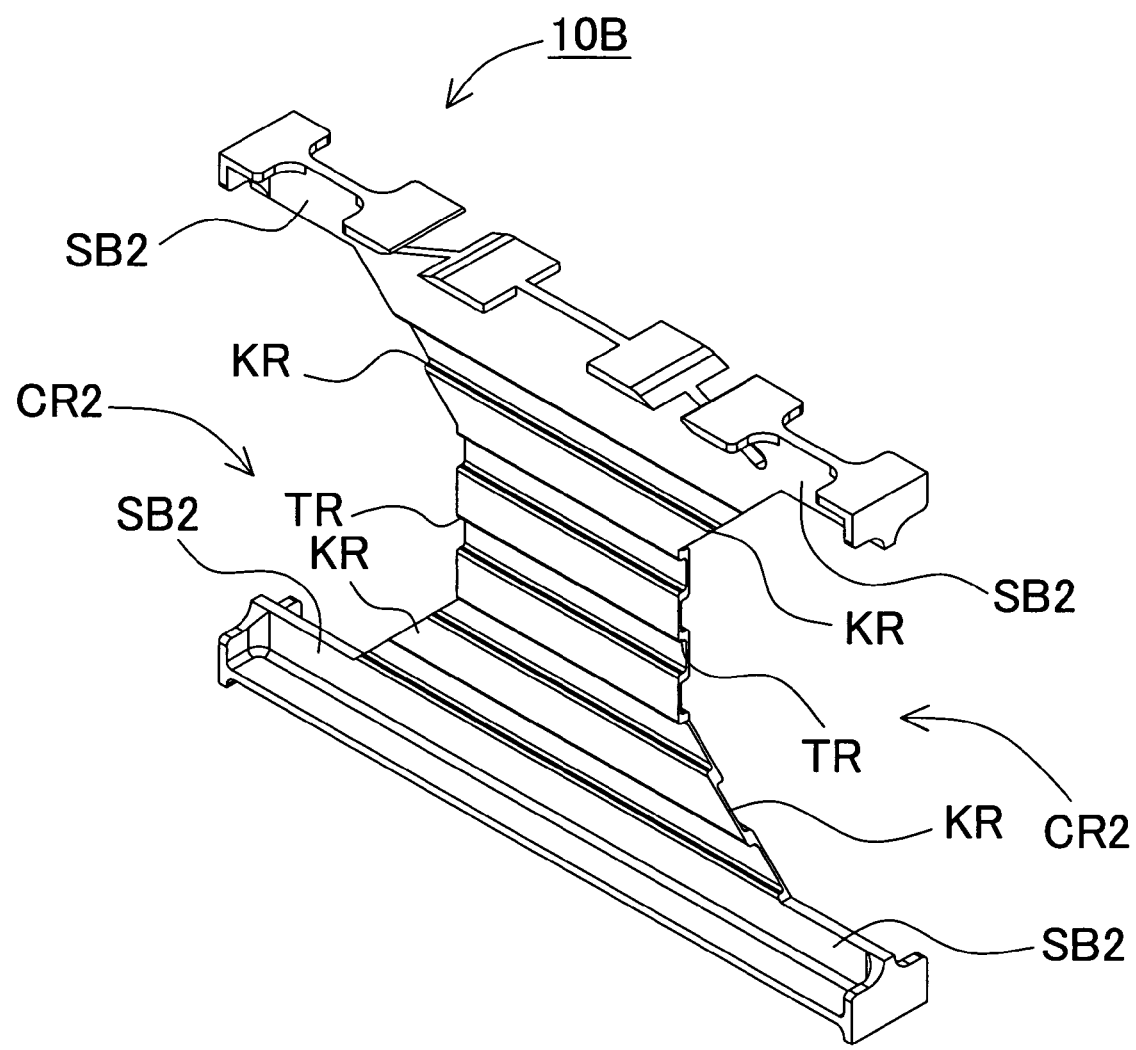
FIG. 8 is a perspective view showing the separator of FIG. 7.

Next, a battery pack 200 for the second form of embodiment is shown in the exploded perspective view of FIG. 7, and its separator 10B is shown in the perspective view of FIG. 8.

In the following description, elements that are identical to those of the first form of embodiment are labeled the same and their detailed description is abbreviated. In the second form of embodiment, the cut section CR2 of the separator 10B is further enlarged with a more concave center to give the separator 10B an hourglass shape. Specifically, the separator 10B is configured with corner regions SB2, center regions TR positioned laterally inward from the corner regions SB2, and sloped regions KR joining the corner regions SB2 and the center regions TR. In the example of FIG. 8, center regions TR have straight edges and the length of the separator 10B at its center is approximately one-third its height. Here, sloped regions KR also have straight edges. By giving the cut sections CR2 straight edge segments, separator 10B formation and post-processing can be simplified. However, the cut section can also be formed in other shapes such as a smooth semi-circular curve without limiting its structure. By making the center of the separator concave and enlarging the cut section in this fashion, pressure losses at both entranceway-sides and exit way-sides can be reduced another level.

Third embodiment

Figure 9:
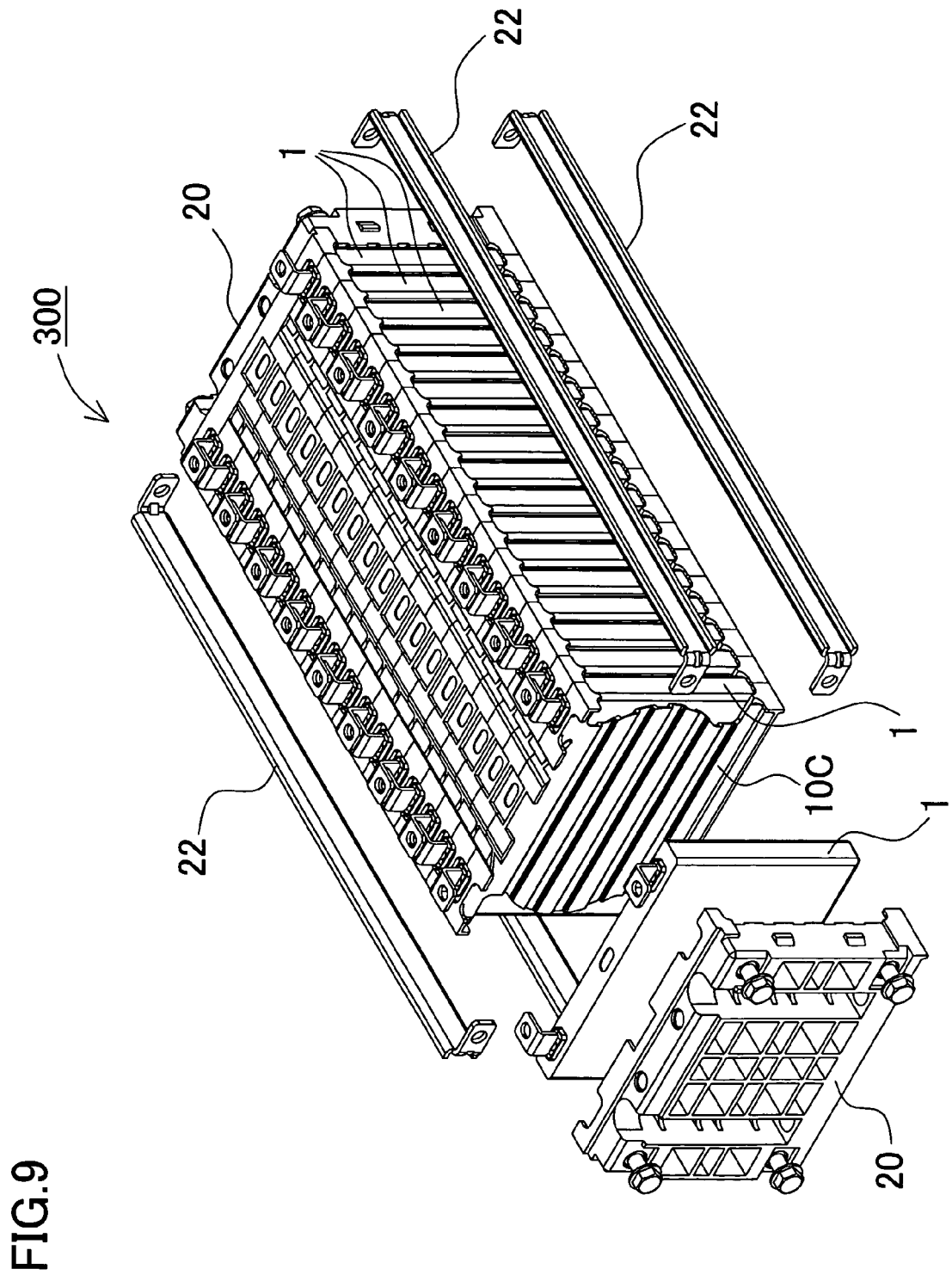
FIG. 9 is an exploded perspective view showing a battery pack for the third form of embodiment of the present invention.
Figure 10:
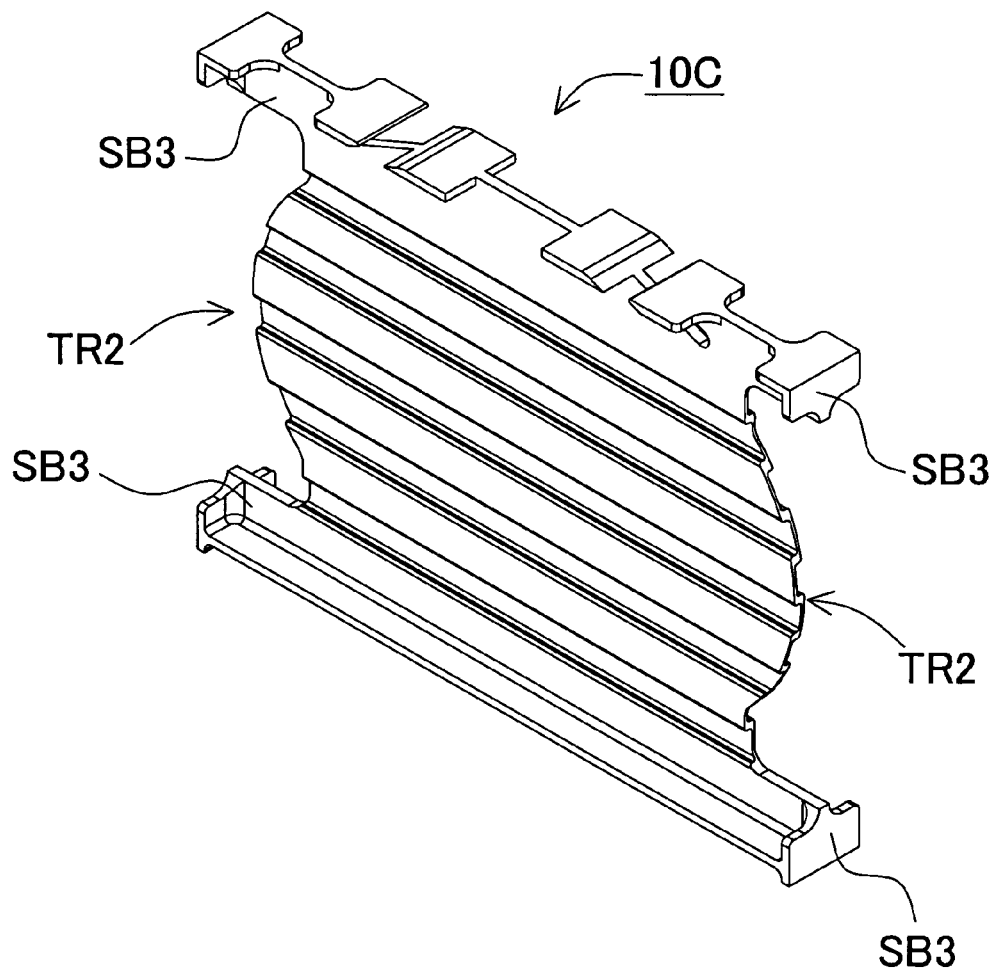
FIG. 10 is a perspective view showing the separator of FIG. 9.

When battery cell swelling is small, even the separator of the second form of embodiment with its laterally narrow center region can maintain insulation between adjacent battery cells and prevent contact between those battery cells. In contrast, when severe battery cell expansion occurs, sufficient insulation may not be afforded by a laterally narrow center region. Consequently, there is concern that battery cells positioned on each side of a narrow separator could contact and short-circuit. In particular, since the battery cell surface carries an electric potential, a configuration is sought that can reliably insulate each battery cell and improve safety. To that end, the third form of embodiment shown in FIGS. 9 and 10 has a separator 10C with a wide lateral center region, which is the inverse of that of the second form of embodiment. Except for corner regions SB3, the left and right edges of the separator 10C are formed as convex (protruding) curves. FIG. 9 shows an exploded perspective view of the battery pack 300 for the third form of embodiment, and FIG. 10 shows a perspective view of a separator 10C. Since the separator 10C shown in these figures is formed with protruding center regions TR2, a large area of the battery cell primary surface can be covered by the separator 10C. With this shape, even severe battery cell expansion can be deterred by the separator 10C and reliable insulation can be maintained between battery cells. In addition, since the separator edge gets further from the side of the battery block as the corner regions SB3 are approached, open areas are established at gas channel entranceways and exit ways near the corners and pressure losses can be reduced. Since the corner regions SB3 of the separator 100 are retained, strength of the frame-shaped separator 10C is maintained, and battery cell expansion can be countered. Since the external case of a battery cell is strong in corner regions, cell expansion in corner regions is small and short-circuiting between exposed regions of battery cells near corner regions SB3 can be precluded. In this manner, the size and shape of separator cut sections can be appropriately selected depending on the amount of expansion of the battery cells used.

Although cut sections that eliminate parts of the separator are established in the previous examples, it is also possible to locally thin parts of the separator instead of eliminating the entire cut sections. Thinner separator material at entranceways and exit ways can widen open areas at those locations. Meanwhile, insulation between battery cells can be maintained to improve safety.

Further, although cut sections are formed on both the entranceway- side and exit way-side of a separator in the previous examples, a cut section can also be formed on the entranceway-side only. This can reduce pressure loss generation at the entranceway-side, which is the side particularly susceptible to large pressure losses, to effectively improve cooling capability.

The battery pack and battery pack separator of the present invention are suitable for use as the batteries of a car power source apparatus for a vehicle such as hybrid electric vehicles (HEV). It should be apparent to those with an ordinary skill in the art that while various preferred embodiments of the invention have been shown and described, it is contemplated that the invention is not limited to the particular embodiments disclosed, which are deemed to be merely illustrative of the inventive concepts and should not be interpreted as limiting the scope of the invention, and which are suitable for all modifications and changes falling within the spirit and scope of the invention as defined in the appended claims. The present application is based on Application No. 2007-282859 filed in Japan on Oct. 31, 2007, the content of which is incorporated herein by reference.

What is claimed is:

1. A battery pack comprising:
a plurality of battery cells; and
insulating separators disposed between adjacent battery cells so that the plurality of battery cells are stacked with a given gap therebetween to form a battery block,
wherein a plurality of gas channels are established in the separators to pass cooling gas,
wherein cooling air entranceways and exit ways of the gas channels open at side surfaces of the battery block of stacked battery cells,
wherein the separators have cut sections formed to position gas channel entranceway and exit way regions inward from the side surfaces of the battery block, and
wherein the plurality of parallel gas channels are established in straight lines from one side of the battery block to the other side of the battery block.

2. The battery pack as cited in claim 1, wherein each separator is formed so that the cut sections are between separator corner regions, and the edges of the separator defining the cut sections are positioned interior relative to the sides of the battery block by an approximately constant standoff distance.

3. The battery pack as cited in claim 1, wherein at least one of the separators is formed with its battery block side-facing edges displaced a distance inward from the sides of the battery block, and that distance increases from the separator corner regions to center region of the separator.

4. The battery pack as cited in claim 1, wherein each separator is formed so that the cut sections are between separator corner regions, and the edges of the separator defining the cut sections are displaced a distance inward from the sides of the battery block, and that distance decreases from the separator corner regions to a center region of the separator.

5. The battery pack as cited in claim 1, wherein the cut sections are formed between separator corner regions, and at least one separator is formed so as to be thinner in areas of the battery block side-facing edges of the separator.

6. The battery pack as cited in claim 1, wherein the gas channels are formed by providing a plurality of troughs and protrusions in the separator surface, and the troughs are closed off by battery cell surfaces to form gas channels with rectangular cross-sections.

7. The battery pack as cited in claim 1, wherein each of the battery cells has an external shape that is approximately rectangular.

8. A battery pack comprising:
a plurality of battery cells; and
insulating separators disposed between adjacent battery cells so that the plurality of battery cells are stacked with a given gap therebetween to form a battery block, wherein:
a plurality of gas channels are established in the separators to pass cooling gas, cooling air entranceways and exit ways of the gas channels open at side surfaces of the battery block
each of the insulating separators have cut sections formed to position at least gas channel entranceway regions inward from the side surfaces of the battery block, and
the plurality of parallel gas channels are established in straight lines from one side of the battery block to the other side of the battery block.

9. The battery pack as cited in claim 8, wherein each of the separators is formed so that the cut sections are between separator corner regions, and the edges of the separator defining the cut sections are positioned interior relative to the sides of the battery block by an approximately constant standoff distance.

10. The battery pack as cited in claim 8, wherein at least one of the separators is formed with its battery block side-facing edges displaced a distance inward from the sides of the battery block, and that distance increases from the separator corner regions to a center region of the separator.

11. The battery pack as cited in claim 8, wherein each separator is formed so that the cut sections are between separator corner regions, and the edges of the separator defining the cut sections are displaced a distance inward from the sides of the battery block, and that distance decreases from the separator corner regions to a center region of the separators.

12. The battery pack as cited in claim 8, wherein the cut sections are formed between separator corner regions, and at least one separator is formed so as to be thinner in areas of the battery block side-facing edges of the separator.

13. The battery pack as cited in claim 8, wherein the gas channels are formed by providing a plurality of troughs and protrusions in the separator surface, and the troughs are closed off by battery cell surfaces to form gas channels with rectangular cross-sections.

14. The battery pack as cited in claim 8, wherein each of the battery cells has an external shape that is approximately rectangular.

15. An insulating battery pack separator inserted between adjacent battery cells to insulate those battery cells, where a plurality of battery cells comprises the battery pack, the separator comprising:
a plurality of parallel gas channels defined to pass cooling gas, and
each of the gas channels includes a cooling air entranceway and a cooling air exit way opening at side surfaces of a battery block of stacked battery cells,
wherein the separator has cut sections formed to position gas channel entranceway and exit way regions inward from the side surfaces of the battery block, and
wherein the plurality of parallel gas channels are established in straight lines from one side of the battery block to the other side of the battery block.

* * * * *